Patented May 27, 1941

2,243,662

UNITED STATES PATENT OFFICE 2,243,662

POLYMERIC MATERIALS

Gordon T. Vaala, Wilmington, Del., assignor to E. I. du Pont de Nemours & Company, Wilmington, Del., a corporation of Delaware No Drawing. Application July 25, 1938, Serial No. 221,233

10 Claims. (Cl. 260—18)

This invention relates to synthetic linear condensation polymers, and more particularly to plasticized compositions comprising these polymers.

A new class of fiber-forming materials known as synthetic linear condensation polymers ("superpolymers") is described in United States Patents 2,071,250–2,071,253. A characteristic property of these polymers is that they can be formed into filaments which can be cold drawn, that is drawn in the solid state, into fibers showing molecular orientation along the fiber axis. Of these polymers the polyamides are most useful for the preparation of fibers, bristles, ribbons, sheets, and the like. The polyamides are of two types, those derived from polymerizable monoaminomonocarboxylic acids and their amide-forming derivatives, and those derived from the reaction of suitable diamines with suitable dicarboxylic acids or amide-forming derivatives of dibasic carboxylic acids. It will be noted that the polyamides are derived from bifunctional amide-forming derivatives. On hydrolysis with mineral acids the polyamides revert to the bifunctional reactants from which they are derived. For example, a polyamide derived from a diamine and dibasic acid yields on hydrolysis with hydrochloric acid, the dibasic acid and the diamine hydrochloride.

Although the synthetic linear condensation polyamides as a class are microcrystalline and have fairly high and sharp melting points, they can be formed into many useful objects without the use of solvents or plasticizers. This is accomplished by spinning, extruding, or otherwise forming the object from the molten polyamide. To improve the properties of the products thus formed, it is generally desirable to subject them to a process of cold drawing (by application of tensile stress) or to a process of cold rolling (by application of compressive stress) or by subjecting them to both cold drawing and cold rolling. These processes of cold drawing and cold rolling to bring about orientation of the polyamide molecules will be referred to generally as cold working. The products thus formed are unusually strong, have high melting points, and for many purposes are sufficiently pliable. For certain uses, however, and particularly for use in the form of films, sheets, and the like, greater pliability is sometimes desired.

Because of the marked difference in structure and properties, e. g., solubility and compatibility characteristics, between the polymers with which the present invention is concerned and fiber-forming materials derived from cellulosic derivatives, the plasticizer requirements of these two classes of materials differ very markedly. For these reasons it is impossible to predict whether a given plasticizer for a cellulose derivative will function as a polyamide plasticizer. The fact that polyamides are insoluble in the solvents used for cellulosic materials and are in general soluble only in phenols and formic acid is also a limiting factor in the selection of a plasticizer to be incorporated by the customary solvent procedure. Another factor which must be taken into consideration is that polyamides, unlike cellulosic derivatives, are susceptible to cold drawing and that polyamide filaments, ribbons, and the like are normally cold drawn before they are used. For the preparation of such products the plasticizer must be one which does not interfere with cold drawing.

This invention has as an object the preparation of new compositions useful in making filaments, bristles, ribbons, films, sheets, etc. Another object is to improve the properties, particularly the pliability, of synthetic linear condensation polyamides and of articles derived therefrom.

These and other objects, which will be apparent from the following description, are accomplished by incorporating in the polyamide a carboxylic acid, having a boiling point above 200° C., preferably an hydroxy carboxylic acid.

A very convenient method for incorporating the carboxylic acid in the polyamide consists in immersing the polyamide in sheet or ribbon form in a solution of the acid in a non-solvent for the polyamide. Concentrated solutions of the acid in alcohol are especially useful. Under these conditions the carboxylic acid is absorbed by the polyamide sheet. In many instances selective absorption occurs as evidenced by the fact that the concentration of the carboxylic acid within the polyamide can be made to exceed that within the solution. After the desired amount of the acid has been absorbed by the polyamide, the sheet is removed and dried. The sheet should not be dried at elevated temperatures. In the solid plasticized products of this invention the amount of acid generally ranges from 1% to 25% by weight of the polyamide, the amount used depending upon the nature of the acid and the properties desired in the final product.

The plasticizing effect of the carboxylic acid is greatly enhanced by the presence within the polyamide sheet of a small amount of alcohol or water. The amount of water which the polyamide sheet absorbs from the air under ordinary conditions of humidity, although only a few percent, is sufficient for this purpose. While this small amount of water very markedly improves the plasticizing effect of the acid, it does not appear to accelerate appreciably the hydrolytic action of the acid.

Other methods of incorporating the carboxylic acid can be also used with some success; for example, the polyamide and carboxylic acid can be dissolved in a mutual solvent and the solution used in making filaments, films, and the like either by evaporative or coagulative methods. The lower fatty acids, e. g. formic acids, may be used as solvents for this purpose. Phenol can also be used. In certain instances, e. g. in the case of many interpolyamides and modified polyamides, alcohols and mixtures of alcohols with halogenated hydrocarbons can be used as solvents. Although certain acids can be incorporated with polyamides without ill effect by admixture with the molten polyamide, particularly in the case of the lower melting polyamides, this is in general not a desirable method, since the acid tends to react with the polyamide when heated at amide-forming temperature. It is desirable therefore not to exceed a temperature of about 150° C. in incorporating carboxylic acids into polyamides. Polyamide-carboxylic acid compositions cannot be prepared by incorporating the carboxylic acid with the reactants used to make the polyamide, since the carboxylic acid takes part in the polymerization reaction. For example, if lauric acid is added to an equimolecular mixture of diamine and dicarboxylic acid and the whole heated to polyamide-forming temperature, the lauric acid takes part in the reaction and cannot therefore contribute the desired plasticizing effect.

The following examples are illustrative of methods for carrying out the invention:

Example I

A transparent sheet 0.030" thick made of polyhexamethylene adipamide (polymer derived from hexamethylenediamine and adipic acid) having an intrinsic viscosity of ca. 0.9 was immersed in a saturated solution of salicylic acid in 50% aqueous ethyl alcohol, maintained at 75° C. The sheet was allowed to remain in the solution for two and one-half hours, removed, rinsed twice with 50% aqueous alcohol, and dried to constant weight in a desiccator over calcium chloride. The sheet showed an 18.6% increase in weight. When the sheet was allowed to remain in contact with the air (50% relative humidity) for several hours, it absorbed about 2% of moisture. The sheet thus plasticized was more pliable and had a softer feel than either the original unplasticized sheet (conditioned at 50% relative humidity) or the sheet containing just the salicylic acid (bone dry). The plasticized sheet had a tensile strength of 7,850 lbs./sq. in. compared with 9,500 lbs./sq. in. for the unplasticized sheet. The plasticized sheet could be cold rolled with greater ease to a transparent film having greater transparency and softness than the unplasticized sheet. This cold rolled film had a tensile strength of 12,500 lbs./sq. in. in the direction of rolling.

Example II

A ribbon of polyhexamethylene adipamide was prepared by extruding the molten polymer between rollers immersed in cold water. After drying to constant weight at 110° C., a sample of this ribbon having a thickness of 0.030" was immersed in a 50% aqueous solution of lactic acid maintained at 75° C. After 3.5 hours, the sample was removed from the lactic acid solution, rinsed twice with water and dried to constant weight at 25° C. over calcium chloride. The sample showed an increase in weight of 15.6%. As in Example I, this film absorbed about 2% of its weight of moisture when allowed to remain in the open. The ribbon containing both the lactic acid and the water was much more pliable than the unplasticized film, or the film containing only the lactic acid. When cold rolled by passing several times through an even-speed hand mill, bringing the rolls closer together after each passage, the film was very pliable and much more transparent than a similarly rolled sample of unplasticized material. The plasticized sample had a tensile strength of 7,350 lbs./sq. in. as compared to 9,500 lbs./sq. in. for the original sample. When cold rolled, the sheet containing the lactic acid had a tensile strength of 15,800 lbs./sq. in. in the direction of rolling which was equal to the tensile strength of the rolled unplasticized ribbon.

Example III

A ribbon of polyhexamethylene adipamide was prepared by extruding the molten polymer between rollers immersed in cold water. After drying to constant weight at 100° C., a sample of this ribbon was immersed in a saturated solution of β-tertiary butyl adipic acid in 30% aqueous ethyl alcohol at 25° C. for 70 hours. The sample was rinsed twice with 30% aqueous alcohol, dried to constant weight at 25° C. and 50% relative humidity, and weighed. The sample had increased in weight by 12.5%. The product was soft and pliable, was easy to cold work, and melted at 252° C. as compared to 255° C. for the original polyamide.

Example IV

A sample of polyhexamethylene adipamide prepared in the same manner as described in Example III was immersed in an 8% solution of mandelic acid in 50% aqueous alcohol, and dried to constant weight in a desiccator over calcium chloride. The sample showed a 9% increase in weight. This ribbon, upon standing in contact with the air for several hours, absorbed about 2% of its weight of moisture and became more pliable than either the unplasticized sheet or the sheet containing only the mandelic acid.

Example V

Ten (10) parts of a copolyamide having an intrinsic viscosity of 0.88 (prepared from equal parts of α, α'-dimethyl hexamethylene diammonium α, α'-dimethyl adipate, and hexamethylene diammonium adipate) were fused at 150° C. to a viscous melt. To this melt were added with stirring 4 parts of levulinic acid to yield a fluid homogeneous composition, which on cooling set to a tough transparent and remarkably pliable solid.

It is to be understood that the aforementioned examples are merely illustrative of the compositions of this invention and their manner of preparation. As examples of additional fiber-forming synthetic linear condensation polyamides which can be plasticized by the addition of carboxylic acids may be mentioned polytetramethylene sebacamide, polypentamethylene adipamide, polypentamethylene sebacamide, polyhexamethylene glutaramide, polyhexamethylene sebacamide, polyoctamethylene adipamide, polydecamethylene carbamide, poly-p-xylylene sebacamide, polyphenylene diacetamide, and the polyamide derived from 3,3'-diaminodipropyl ether and adipic acid. Polymerized 6-aminocaproic acid, polymerized 9-aminononanoic acid, and polymerized 11-aminoundecanoic acid are additional examples of linear condensation polyamides which may be used. As illustrated in Example V, copolyamides or interpolyamides can likewise be plasticized by carboxylic acids. Obviously, the invention is also applicable to mixtures of polyamides. In general the synthetic linear condensation polyamides do not possess fiber-forming properties unless they have an intrinsic viscosity above 0.4. Likewise to be useful in making films, ribbons, etc., the polyamide should have an intrinsic viscosity above 0.4 and preferably above 0.6. The expression, intrinsic viscosity, is to be understood in accordance with the definition thereof contained in Carothers U. S. Patent 2,130,948.

Instead of the polyamides mentioned above which are obtainable from bifunctional polyamide-forming reactants as essentially sole reactants, I may use the linear condensation polyamides obtained by including with the polyamide-forming reactants used to prepare the polyamide other bifunctional reactants, such as glycols and hydroxy acids. As examples of such modified polyamides may be mentioned those derived from diamines, dibasic acids, and glycols; those derived from diamines, dibasic acids, and hydroxy acids; those derived from amino acids, dibasic acids, and glycols; and those derived from amino acids and hydroxy acids. Although these products contain ester linkages they can still be referred to as polyamides since they contain a plurality of amide linkages and retain many of the desirable properties of the straight polyamides. Like the straight polyamides, these modified polyamides do not exhibit fiber-forming properties until their intrinsic viscosity is at least 0.4.

As additional examples of carboxylic acids which may be used in making the compositions of this invention may be mentioned succinic, glutaric, α-methyl adipic, β-methyl adipic, diglycolic, hydroxy-butyric, stearic, tetrahydrofuroic, hydroxy valeric, glyceric, benzoic, o-benzoyl benzoic, diphenic, camphoric, coumaric, bissulfone diacetic, and drying oil acids.

This invention is not limited to compositions consisting of polyamide and carboxylic acid alone. As already indicated, the plasticizing effect of the acid is greatly increased by the presence of a small amount of water or alcohol. Other hydroxylated non-solvents and particularly alcohols, such as methanol, propanol, isobutanol, benzyl alcohol, cyclohexanol, hexamethylene glycol, and glycerol have a similar effect. Moreover, there may be associated with the polyamide-carboxylic acid compositions other types of plasticizers, such as dibutyl phthalate and tricresyl phosphate. The compositions of this invention may also contain other types of modifying agents, e. g., luster modifying materials, pigments, dyes, antioxidants, oils, antiseptics, cellulose derivatives, etc.

The carboxylic acids of high boiling point used in the practice of this invention not only comply with the requirement mentioned above of not interfering with cold drawing or cold working or with the orientation of the polymer molecules, but also actually improve the working properties, and particularly cold rolling. Furthermore, the pliability caused by the acid is more marked in the cold rolled product than in the unrolled product. The acid shows little tendency to escape or exude from the polyamide composition and does not cause hydrolysis except at elevated temperatures. The addition of the carboxylic acid, surprisingly, does not materially lower the melting point or strength of the product or cause it to soften over a wide range.

The polyamide-carboxylic acid compositions described herein are useful in many forms and for many purposes. Typical applications are yarns, fabrics, bristles, surgical sutures, rods, tubes, dental floss, films, ribbons, sheets, safety glass interlayers, molded articles, adhesives, impregnating agents, electrical insulation, and coating compositions. The greater pliability of the compositions of this invention over unmodified polyamides is particularly advantageous in connection with the use of the product in sheet form. A further advantage of these compositions over the unmodified polyamides is that they are more readily cold rolled.

As many apparently widely different embodiments of this invention may be made without departing from the spirit and scope thereof, it is to be understood that I do not limit myself to the specific embodiments thereof except as defined in the appended claims.

I claim:

1. A synthetic linear polyamide plasticized with a carboxylic acid having a boiling point above 200° C., the said polyamide being the reaction product of a polymer-forming composition comprising reacting materials selected from the class consisting of (a) polymerizable monoaminomonocarboxylic acids, and (b) mixtures of diamine and dibasic carboxylic acid; the said polyamide having an intrinsic viscosity of at least 0.4.

2. A synthetic linear polyamide plasticized with a carboxylic acid having a boiling point above 200° C., the said polyamide being the reaction product of a polymer-forming composition comprising reacting materials selected from the class consisting of (a) polymerizable monoaminomonocarboxylic acids, and (b) mixtures of diamine and dibasic carboxylic acid; the said polyamide being one which can be formed into fibers showing by characteristic X-ray patterns orientation along the fiber axis.

3. A synthetic linear polyamide plasticized with a carboxylic acid having a boiling point above 200° C., the said polyamide being the reaction product of a polymer-forming composition comprising a polymerizable monoaminomonocarboxylic acid, and having an intrinsic viscosity of at least 0.4.

4. A synthetic linear polyamide plasticized with a carboxylic acid having a boiling point above 200° C., the said polyamide being the reaction product of a polymer-forming composition comprising a mixture of diamine and dibasic carboxylic acid and having an intrinsic viscosity of at least 0.4.

5. The plasticized synthetic linear polyamide set forth in claim 1 wherein the said carboxylic acid having a boiling point above 200° C. is a hydroxy acid.

6. A synthetic linear polyamide plasticized with a mixture comprising a carboxylic acid having a boiling point above 200° C. and a hydroxylated non-solvent for the polyamide, the said polyamide being the reaction product of a polymer-forming composition comprising reacting materials selected from the class consisting of (a) polymerizable monoaminomonocarboxylic acids, and (b) mixtures of diamine and dibasic carboxylic acid; the said polyamide having an intrinsic viscosity of at least 0.4.

7. The plasticized synthetic linear polyamide set forth in claim 6, wherein the said hydroxylated non-solvent is water.

8. The plasticized synthetic linear polyamide set forth in claim 1 wherein the said carboxylic acid having a boiling point above 200° C. is salicylic acid.

9. The plasticized synthetic linear polyamide set forth in claim 1 wherein the said carboxylic acid having a boiling point of 200° C. is orthobenzoyl benzoic acid.

10. The plasticized synthetic linear polyamide set forth in claim 1 wherein the said carboxylic acid having a boiling point above 200° C. is stearic acid.

GORDON T. VAALA.